US009859927B2

(12) United States Patent
Lindsay et al.

(10) Patent No.: US 9,859,927 B2
(45) Date of Patent: Jan. 2, 2018

(54) COMMUNICATION-SATELLITE SYSTEM THAT CAUSES REDUCED INTERFERENCE

(71) Applicant: WorldVu Satellites Limited, St Helier, Jersey (GB)

(72) Inventors: Michael Lindsay, Jersey (GB); Gregory Thane Wyler, Sewalls Point, FL (US)

(73) Assignee: WorldVu Satellites Limited, St Helier (JE)

( * ) Notice: Subject to any disclaimer, the term of this patent is extended or adjusted under 35 U.S.C. 154(b) by 285 days.

(21) Appl. No.: 14/626,360

(22) Filed: Feb. 19, 2015

(65) Prior Publication Data

US 2016/0149599 A1    May 26, 2016

Related U.S. Application Data

(60) Provisional application No. 62/083,412, filed on Nov. 24, 2014.

(51) Int. Cl.
*H04B 1/04*    (2006.01)
*H04B 7/185*    (2006.01)
(Continued)

(52) U.S. Cl.
CPC ....... *H04B 1/0475* (2013.01); *H04B 7/18515* (2013.01); *H04B 7/19* (2013.01);
(Continued)

(58) Field of Classification Search
CPC combination set(s) only.
See application file for complete search history.

(56) References Cited

U.S. PATENT DOCUMENTS 5,822,680 A * 10/1998 Stuart ................ H04B 7/18513
455/12.1
6,866,231 B2    3/2005 Higgins
(Continued)

FOREIGN PATENT DOCUMENTS

EP    0836290 A2    4/1998
EP    1139585 A2    10/2001

OTHER PUBLICATIONS

"SkyBridge", "http://www.usfca.edu/fac-staff/morriss/651/spring00/techprojects/leo/skyprofile.html", Publisher: http://www.skybridgesatellite.com.
(Continued)

*Primary Examiner* — Yuwen Pan
*Assistant Examiner* — Zhitong Chen
(74) *Attorney, Agent, or Firm* — Kaplan Breyer Schwarz, LLP

(57) ABSTRACT

A system of low-orbiting communication satellites that can share radio spectrum with geostationary satellites and methods mitigating interference to enable sharing are disclosed. In some embodiments, the satellite progressively tilts as it travels along its orbit, or its transmission beams are mechanically or electronically tilted. As a consequence of the tilting, as a satellite approaches the equatorial plane, its transmission beams are aimed more and more toward the equatorial plane, compared to when the satellite is far from the equatorial plane. Using this technique, an angular separation sufficient to prevent interference between the satellite's radio signals and GEO radio signals at all satellite positions is maintained, and, as a result good coverage is provided to all ground locations.

14 Claims, 15 Drawing Sheets

(51) Int. Cl.
*H04W 72/08* (2009.01)
*H04W 72/04* (2009.01)
*H04L 12/64* (2006.01)
*H04W 84/06* (2009.01)
*H04B 7/19* (2006.01)
*H04B 7/195* (2006.01)

(52) U.S. Cl.
CPC .......... *H04B 7/195* (2013.01); *H04W 72/046* (2013.01); *H04W 72/082* (2013.01); *H04L 2012/6421* (2013.01); *H04W 84/06* (2013.01)

(56) References Cited

U.S. PATENT DOCUMENTS

| | | | | |
|---|---|---|---|---|
| 2007/0072603 A1* | 3/2007 | Wang | ................ | H04B 7/18513 455/427 |
| 2010/0201566 A1* | 8/2010 | Wyler | ................ | H04B 7/1851 342/354 |
| 2013/0035047 A1* | 2/2013 | Chen | .................... | H04B 1/406 455/79 |

OTHER PUBLICATIONS

Authorized Officer: Theresia Van Deursen, "International Search Report and Written Opinion" dated Jul. 21, 2016 in counterpart PCT Application No. PCT/IB2015/002383, Publisher: PCT, Published in: EP.

* cited by examiner

Satellite in LEO polar orbit

LEO satellite and GEO satellite

Radio transmissions from LEO satellite

Radio transmissions from GEO satellite

Radio interference between LEO satellite and GEO satellite

Multiple-beam transmission from LEO satellite

Multiple-beam coverage pattern 900

Continuous coverage via multiple satellites

Continuous coverage via multiple *tilting* satellites

Interference mitigation via combined satellite tilting and selective beam activation

COMMUNICATION-SATELLITE SYSTEM THAT CAUSES REDUCED INTERFERENCE

CROSS REFERENCE TO RELATED APPLICATIONS

This case claims priority of U.S. provisional application Ser. No. 62/083,412 filed on Nov. 24, 2014, which is incorporated herein by reference.

FIELD OF THE INVENTION

The present invention relates to earth-orbiting communication satellites in general, and, more particularly, to communication satellites that share radio spectrum with other communication satellites without mutual interference.

BACKGROUND OF THE INVENTION

Ever since the beginning of the space age, communication satellites have been an important application of space technology. The first communication satellite was Telstar. At the time, it was an extraordinary technological achievement. It was designed, built and operated by Bell Telephone Laboratories, Holmdel, N.J., USA.

Communication satellites receive and transmit radio signals from and to the surface of the Earth. For Telstar, being the first and only communication satellite of its time, there was no issue of interference between its radio signals and radio signals associated with other communication satellites. But this situation changed quickly as the technology advanced and demand for communication-satellite services exploded.

At the present time, demand for all manners of wireless communications has reached new highs, and the radio spectrum has become a very valuable commodity. In January, 2015, as part of a government auction, fifty MHz of radio spectrum have fetched an unprecedented $39.5 billion. Therefore, being able to establish a radio communication system that does not require dedicated spectrum would be a significant advantage.

When it comes to communication satellites, the so-called geostationary satellites are a well established type of satellites that have provided a variety of useful services for many decades. Geostationary satellites orbit the Earth in a plane that intersects the Earth at the Equator (the "equatorial plane"). They orbit at a distance from the Earth such that the period of their orbit is exactly one sidereal day. The geostationary orbit is a circle and, therefore, geostationary satellites go around the Earth at exactly the same rate as the Earth rotates around its axis. As a result, each geostationary satellite appears, from the Earth, at a fixed position in the sky, as if it were mounted on an extremely tall tower.

That virtual tower is, indeed, very high: about 36,000 km, or almost six times the Earth's radius. The great distance between geostationary (commonly abbreviated as "GEO") satellites and the surface of the Earth has several undesirable consequences, including a need for higher transmitted signal power, difficulty in generating small transmission footprints, and an annoying delay in communications, among others. For certain applications, including internet services, satellites that orbit closer to the surface of the Earth might be better suited.

FIG. 1 depicts a satellite in a low earth orbit (commonly abbreviated as "LEO"). While there is no international standard for the exact meaning of orbit-type designators such as "GEO", "LEO", and "MEO" (which stands for "middle earth orbit") they are commonly used in the art. LEO orbits are generally assumed to be orbits where the satellite orbits no more than about 2000 km above the surface of the Earth. In FIG. 1, the LEO orbit is depicted by a dashed circular line as LEO polar orbit 150. Because the orbit is circular, the satellite orbits the Earth 110 at an approximately constant distance from the Earth's surface. In FIG. 1, that distance is small compared to the Earth's radius; at the scale of the Figure, it corresponds to approximately 900 km.

The type of LEO orbit depicted in FIG. 1 is known as a "polar" orbit because it passes over the North pole and the South pole. One advantage of polar orbits is that the satellite passes over all latitudes. As the Earth rotates (while the plane of the orbit remains approximately unchanged) the satellite will pass over different areas of the Earth. With an appropriately chosen orbital period, the satellite can be made to pass over every place on Earth, after a large-enough number of orbits. For this reason, polar orbits (or nearly-polar orbits) are often chosen for earth-surveying satellites.

FIG. 2 depicts the same LEO satellite and satellite orbit of FIG. 1, together with a depiction of a geostationary satellite for the purpose of emphasizing the different orbital sizes, which are drawn to scale. In the figure, GEO satellite 230 orbits the Earth 110 in the plane of the Earth's Equator 210. The plane is depicted by a dashed line as equatorial plane 220. As predicted by geometry, LEO polar orbit 150 intersects the equatorial plane at right angles. There are two points of intersection. In the art, the two points of intersection between an orbit and equatorial plane 220 are known as "nodes". The North pole is on one side of equatorial plane 220, and the South pole is on the other side. The satellite travels along its orbit in the direction shown in FIG. 2 as "101 direction of motion". At one of the nodes, it passes through equatorial plane 220 going toward the North pole. That node is commonly referred to as the "ascending" node, while the other node is commonly referred to as the "descending" node.

The nomenclature of "ascending" and "descending" nodes can also be defined when satellite 230 is not a geostationary satellite and its orbit is not in the equatorial plane. For example, satellite 230 might be a geosynchronous satellite orbiting the Earth in the so-called GEO stable plane which is inclined, relative to the equatorial plan, at an angle of about 7.3°. For any plane that passes through the center of the Earth, the North pole lies on one side of the plane, and the South pole lies on the other side. As the satellite travels along its orbit, at one of the nodes it passes through the plane going toward the side of the plane where the North pole lies. That node is referred to as the "ascending" node, while the other node is referred to as the "descending" node, FIG. 3 presents a more detailed depiction of the LEO satellite and its relationship to the surface of the Earth below it. In particular, it shows the case where the LEO satellite is a communication satellite. (In this detailed figure and in many of the subsequent figures, continental outlines on the surface of the Earth have been omitted to avoid clutter). The LEO satellite 140 is equipped with one or more radio antennas. The antennas transmit one or more radio signals toward the surface of the Earth 110. Such transmissions are shown in the figure as radio transmissions 310. The radio transmissions can be received by receivers located on the surface of the Earth within a certain coverage area depicted as coverage area 320. Outside of coverage area 320, the radio signals from the satellite are expected to be too weak for adequate reception; indeed, the radio antennas on the satellite can be deliberately designed to make such radio signals weak for the purpose of limiting interference caused by those signals to other receivers outside coverage area 320.

FIG. 4 shows what happens when GEO satellite 230 is a communication satellite that serves a portion of the Earth that overlaps coverage area 320 (not explicitly shown in this figure). Like the LEO satellite, the GEO satellite is also equipped with one or more radio antennas that transmit one or more radio signals toward the surface of the Earth. Such transmissions are shown in the figure as radio transmissions 410. The radio transmissions are aimed at a portion of the Earth depicted in the figure as coverage area 420.

LEO satellite 140 is shown FIG. 4 as being very close to coverage area 420; therefore, even though coverage area 320 is not shown explicitly, coverage area 320 clearly overlaps coverage area 420, at least in part. If radio transmissions 410 and radio transmissions 310 comprise radio signals in the same part of the radio spectrum, there is the potential for interference between transmissions from the LEO satellite and transmissions for the GEO satellite.

Under International Telecommunications Union (ITU) rules, non-geostationary (NGSO) satellites such as LEO satellite 140 are allowed to use the same spectrum as GEO satellites under certain conditions. In particular, NGSO satellites must not interfere with GEO satellites that use the same spectrum frequencies. The ITU rules set out specific guidelines as to how much radio signal power into a GEO satellite's terminal can be created without needing to "coordinate" or talk with and get approval from the GEO satellite's operator.

FIG. 5 depicts a possible scenario for how unacceptable interference can be caused by a LEO satellite to the signal from a GEO satellite. On the surface of the Earth 110, there is a GEO receiver 510 that is attempting to receive a radio signal 520 from a GEO satellite. However, GEO receiver 510 is located inside coverage area 320 where radio transmissions 310 from LEO satellite 140 comprise radio signals that might use frequencies that fall within the spectrum band used by the GEO satellite. To make matters worse, LEO satellite 140 lies along the line of sight between GEO receiver 510 and the GEO satellite. Therefore, the path followed by GEO radio signal 520 on its way to GEO receiver 510 passes near LEO satellite 140, and, from the point of view of GEO receiver 510, both the desired radio signal 520 and the interfering radio transmissions 310 arrive from the same direction. Under these conditions, without employing further mitigation techniques, and depending upon the power spectral density of the interfering radio transmissions 310, the GEO receiver 510 may have difficulty achieving good reception of radio signal 520.

FIG. 6 depicts a technique commonly used to mitigate the type of interference situation depicted in the previous figure. In FIG. 6, LEO satellite 140 simply reduces the size of the coverage area 620 over which it provides communication services. With such a reduction, GEO receiver 510 is now located outside coverage area 620. It is still true that, from the point of view of GEO receiver 510, the desired radio signal 520 arrives from the same direction as any interfering radio transmissions from LEO satellite 140 that "spill over" outside the boundary of reduced coverage area 620. However, as already mentioned, the radio antennas on LEO satellite 140 can be designed such that radio signals that spill over outside of coverage area 620 are weak. Antennas can be designed such that those signals are as weak as necessary to meet ITU limits.

What about receivers that are inside reduced coverage area 620? FIG. 6 depicts one such receiver as GEO receiver 515. It is located near the boundary of reduced coverage area 620, and it is attempting to receive radio signal 525 from the GEO satellite. From the point of view of GEO receiver 515, the desired radio signal 525 does not arrive from the same direction as interfering radio transmissions from LEO satellite 140. There is a non-zero angle between the two directions of arrival. Because of this angle, GEO receiver 515 is better able to discriminate between radio signal 525 and radio transmissions 140. In other words, thanks to the angle, the power spectral density of radio transmissions 140, as received by GEO receiver 515, can more easily meet the ITU limits. Of course, the larger the angle, the greater the benefit; therefore, the worst-case position for a GEO receiver, within reduced coverage area 620, is where GEO receiver 515 is depicted in FIG. 6, near the northern boundary of reduced coverage area 620, where the angle is smallest. Such smallest angle is depicted in FIG. 6 as angular separation 630. Because radio signal 520 is substantially parallel to radio signal 525, angular separation 630 can be measured relative to either of the two radio signals, as shown in the figure.

The presence of angular separation 630 makes it possible for GEO receiver 515 to achieve good reception of desired radio signal 525 even in the presence of interfering radio transmissions 610 from LEO satellite 140. This is true as long as angular separation 630 is sufficiently large. How large it needs to be depends heavily on the characteristics of the antenna used by GEO receiver 515 for receiving the radio signal 525. As it turns out, Earth-based receivers of GEO satellite signals must typically use so-called high-gain antennas. Such antennas exhibit excellent angular selectivity which enables them to reject interfering signals with an angular separation as small as a few degrees. Moreover, there are well-defined standards for the characteristics of GEO receiver antennas. As a result, a LEO satellite can implement a carefully chosen angular separation and be confident of not interfering with GEO receivers.

The technique illustrated in FIG. 6 can be easily implemented if radio transmissions from the satellite are in the form of multiple independent beams aimed in different directions. In that case, the coverage area can be reduced simply by turning off some of the beams. However, there are several disadvantages. One disadvantage is that, of course, by reducing the coverage area, the effectiveness of a satellite is reduced. It can serve fewer communication terminals on the surface of the Earth, and the volume of traffic that the satellite carries is reduced. But another important disadvantage is that the technique is of limited utility. The situation depicted in FIG. 6 is applicable to areas of the Earth at mid to high latitudes. In the depiction of FIG. 6, North is up (same as in the preceding figures) and the angle of the surface of the Earth corresponds to a latitude of 47°. Most of the population of the Earth lives at or below this latitude. Yet, with the geometry of FIG. 6, it is clear that the coverage area served by LEO satellite 140 must be severely curtailed, if interference to GEO receivers is to be avoided. The situation becomes much worse at lower latitudes, as is illustrated in the next figure.

FIG. 7 shows what happens when the interference mitigation technique of FIG. 6 is attempted at lower latitudes. In particular, FIG. 7 depicts LEO satellite 140 when its orbit 150 brings it near the Equator. The figure also depicts GEO receiver 710, which is attempting to receive radio signal 720 from a GEO satellite. It is clear that the direction of arrival of radio signal 720, as received at GEO receiver 710, is the same as the direction of arrival of interfering radio transmissions 712 from the LEO satellite. The geometry is such that this is true even in the middle of coverage area 722. No extent of reduction in the size of coverage area 722 will achieve a reasonable angular separation between radio signal 720 and the interfering radio transmissions 712. The only way for LEO satellite 140 to meet the ITU rules is to cease all transmissions, or to potentially operate at a significantly lower power spectral density, thereby negatively impacting service provided by satellite 140.

Since there are plural orbiting satellites, this problem always exists for one of more of them at any given time. It is, of course, undesirable to have to turn off a satellite, especially if this has to happen consistently, always at the same location. Such location will not receive communication services. In this case, the problem occurs consistently at all low latitudes. FIG. 7 illustrates the difficulty of providing communication services to areas of the Earth at low latitudes with LEO satellites, if those satellites must share the radio spectrum with GEO satellites.

In FIGS. 3-7, radio transmissions from a satellite are simply depicted as a cone emanating from the satellite. In typical communication satellites, such transmissions comprise multiple independent beams, each carrying one or more radio signals. Multiple beams can be generated via, for example, multiple independent antennas, or via a single antenna reflector with multiple feeds, or via antenna arrays, or via other means. FIGS. 8 and 9 illustrate the use of multiple beams with LEO communication satellites.

FIG. 8 depicts a LEO communication satellite 840 capable of transmitting multiple independent beams 810. The beams are aimed at the surface of the Earth. Each beam provides radio coverage to a portion of the overall coverage area. Ideally, different beams should not overlap, but, of course, a certain amount of overlap is unavoidable and, indeed, necessary to avoid coverage gaps between beams. Nonetheless, it is customary to depict the pattern of coverage as if the beams were disjoint.

FIG. 9 depicts an example of a beam-coverage pattern. The nineteen hexagons represent the footprints of nineteen beams emanating from the satellite. The footprints lie on the surface of the Earth. All the hexagons are of equal size, such that all the beams experience approximately equal traffic loads. Note that the hexagons near the periphery (hexagons 8 through 19) result from beams that reach the ground at a low elevation angle, while the hexagons near the center (such as hexagon 1) result from beams that reach the ground from a near-vertical direction. The actual pattern of beams emanating from the satellite, and the antennas that generate the beams, must be adjusted such that the beams near the periphery are of a different shape, compared to the beams near the center, such that the footprints on the ground achieve the desired regular pattern. It is well known in the art how to design an antenna system that generates a three-dimensional pattern of beams such that, when the beams reach the ground, they form footprints in a desired coverage pattern.

A LEO satellite in a circular orbit travels around the Earth at a substantially constant distance form the surface of the Earth. The satellite is equipped with an attitude control system for controlling the orientation of the satellite. The orientation is adjusted such that the satellite antennas are always pointed toward the surface of the Earth, and such that the geometry of the antennas relative to the surface of the Earth below the satellite is unchanged as the satellite travels along its orbit. This is done to ensure that the coverage pattern shown in FIG. 9 remains unchanged under the satellite and travels together with the satellite, as the satellite travels along its orbit.

While in orbit, communication satellites must maintain their antennas in a precise orientation, relative to the Earth. The antennas, then, can transmit radio signals aimed at the surface of the Earth in a geometric pattern devised to provide good coverage for radio terminals on the surface of the Earth. For LEO satellites, that pattern usually comprises a plurality of independent beams, each of which covers a portion of the overall coverage area. FIGS. 8 and 9 illustrate such multibeam coverage.

In the prior art, LEO communication satellites follow circular orbits and maintain a fixed orientation, relative to their direction of motion, with the beam pattern aimed downward, toward the surface of the Earth. This way, the coverage pattern on the surface of the Earth moves along with the satellite without changing its shape.

Such a coverage pattern achieves good performance, if the satellite can use dedicated spectrum. But, if the satellite must share spectrum with one or more GEO satellites, the problems illustrated in FIGS. 6 and 7 require that a number of beams be turned off over large portions of the orbit, and all the beams must be turned off when the satellite is near the equatorial plane.

SUMMARY OF THE INVENTION

A LEO satellite in accordance with embodiments of the present invention follows a circular orbit, but it does not maintain a fixed orientation relative to its direction of motion. Instead, the satellite progressively tilts (see the definition of "tilt" in the Definitions sections below) as it travels along its orbits. In particular, the progressive tilting is such that the satellite's coverage pattern on the surface of the Earth changes and advances faster than the satellite itself, as the satellite travels along its orbit.

As a consequence of the tilting, as a satellite approaches the equatorial plane, its transmission beams are aimed more and more toward the equatorial plane, compared to when the satellite is far from the equatorial plane. The geometry of a satellite approaching the equatorial plane is illustrated in FIGS. 10-12. The figures show that, through this technique, a good angular separation is maintained between the satellite's radio signals and the GEO radio signals at all satellite positions. It is not necessary to turn off part of the LEO satellites transmissions.

A satellite communication system based on tilting LEO satellites in accordance with embodiments of the present invention can share spectrum with one or more GEO satellites while, at the same time, providing good coverage on the surface of the Earth without gaps, even for areas near the Equator. In such a system, a plurality of LEO satellites orbit the Earth in a plurality of orbits inclined relative to the equatorial plane. For example, such orbits might be polar, or near polar circular orbits. In each orbit, a plurality of LEO satellites travel at equally-spaced intervals; they provide coverage to areas on the surface of the Earth below the orbit. Note that while polar circular orbits are used here for exemplary purposes, the techniques described herein need not necessarily be limited to polar, or any other type of orbits.

In each polar orbit, the satellites that travel in that orbit, evenly spaced along the orbit, provide full, uninterrupted coverage to areas on the surface of the Earth that lie below the orbit. This is possible even though, at any given time, a subset of those satellites is turned off and not providing communication services. The satellites that are turned off are those that are nearest the equatorial plane. Those satellites are turned off to prevent them from causing interference to radio signals from GEO satellites.

The geometry of the system is illustrated in FIG. 14. The satellites that are turned off, as they travel across the equatorial plane, also change their tilt angle while they are turned off. This way, when they again turn on and restart providing coverage, their radio transmissions are aimed behind them, along their direction of travel. They can then resume the progressive forward tilting that gradually brings their coverage area ahead of them, as they travel along the orbit. When they, again, reach the equatorial plane, after traveling along half of their orbit, the process is repeated. FIG. 12 illustrates the transit of a satellite across the equatorial plane, and FIG. 15 illustrates how, when a satellite turns off, its coverage area is "handed over" to another satellite that is being turned on, so that the coverage area receives uninterrupted coverage.

DETAILED DESCRIPTION

Figure 1:
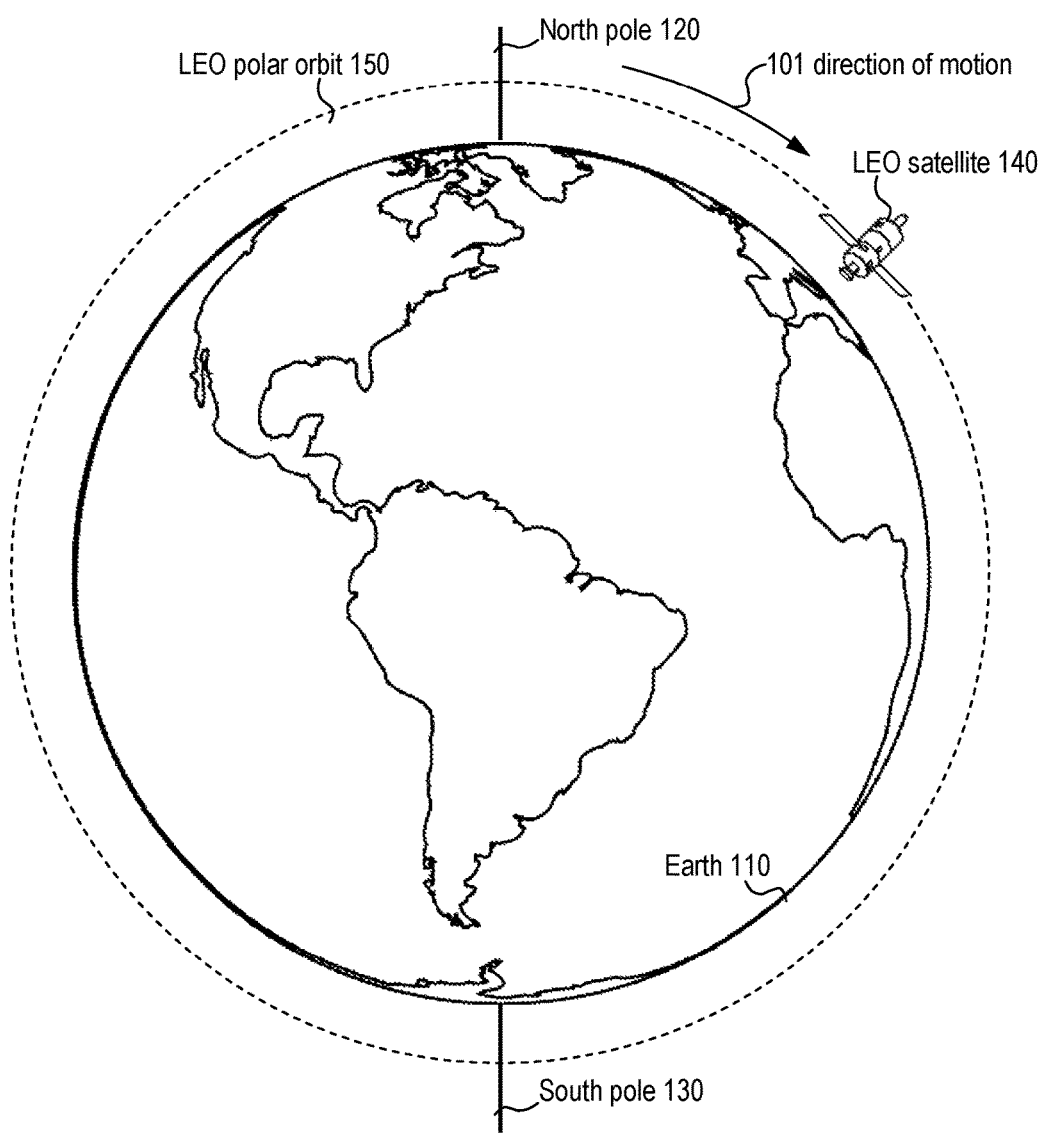
FIG. 1 depicts, in the prior art, a LEO satellite in low earth polar orbit.
Figure 2:
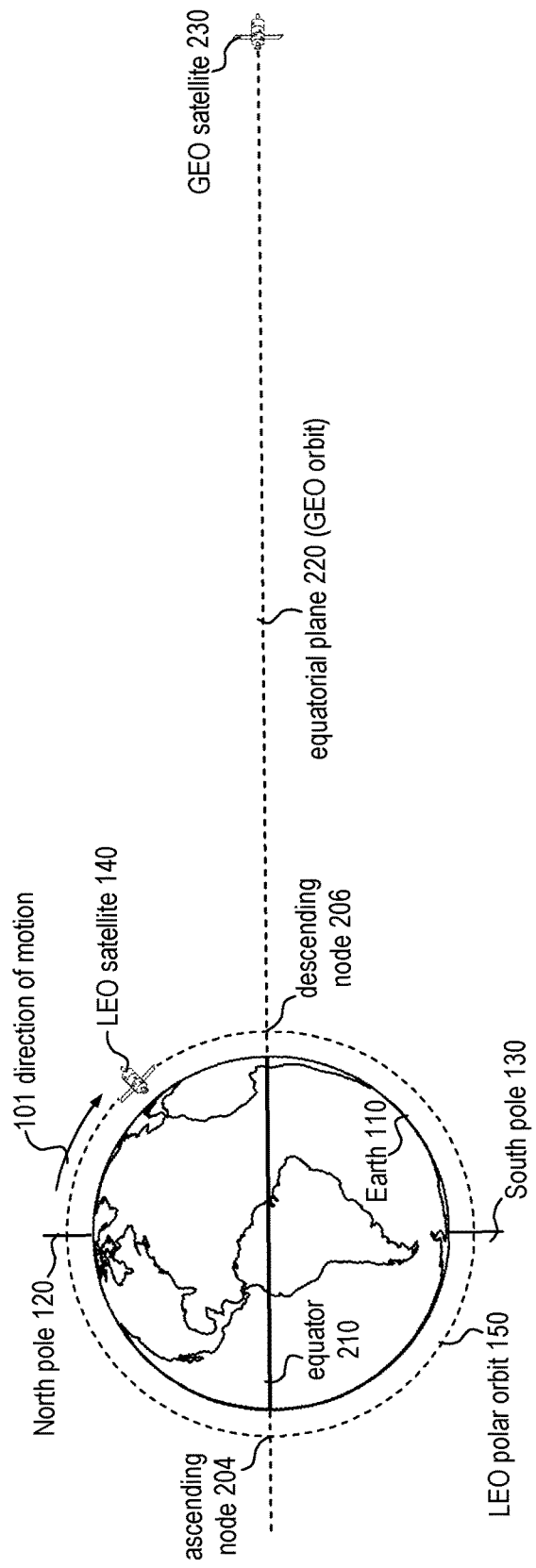
FIG. 2 depicts, in the prior art, a LEO satellite in low earth polar orbit and a GEO satellite in geostationary orbit.
Figure 3:
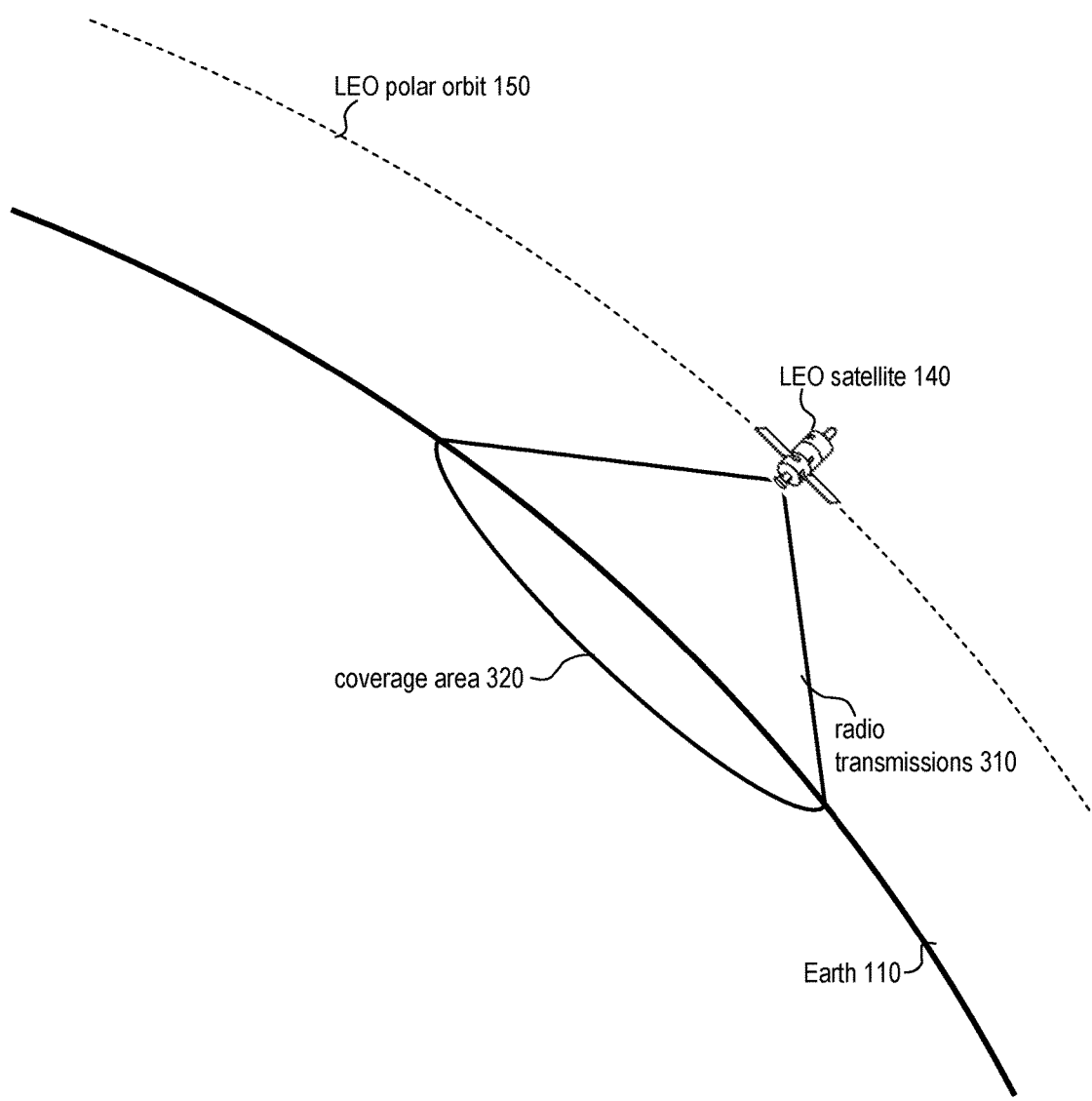
FIG. 3 depicts, in the prior art, the coverage area of a LEO satellite.
Figure 4:
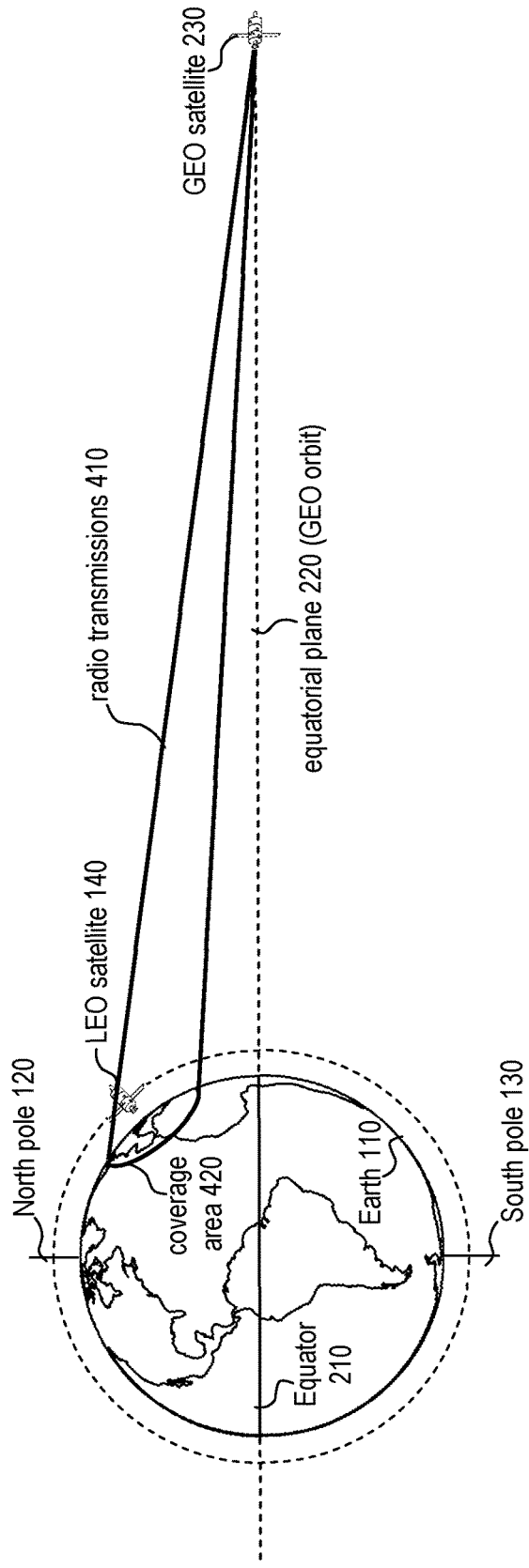
FIG. 4 depicts, in the prior art, the coverage area of a GEO satellite.
Figure 5:
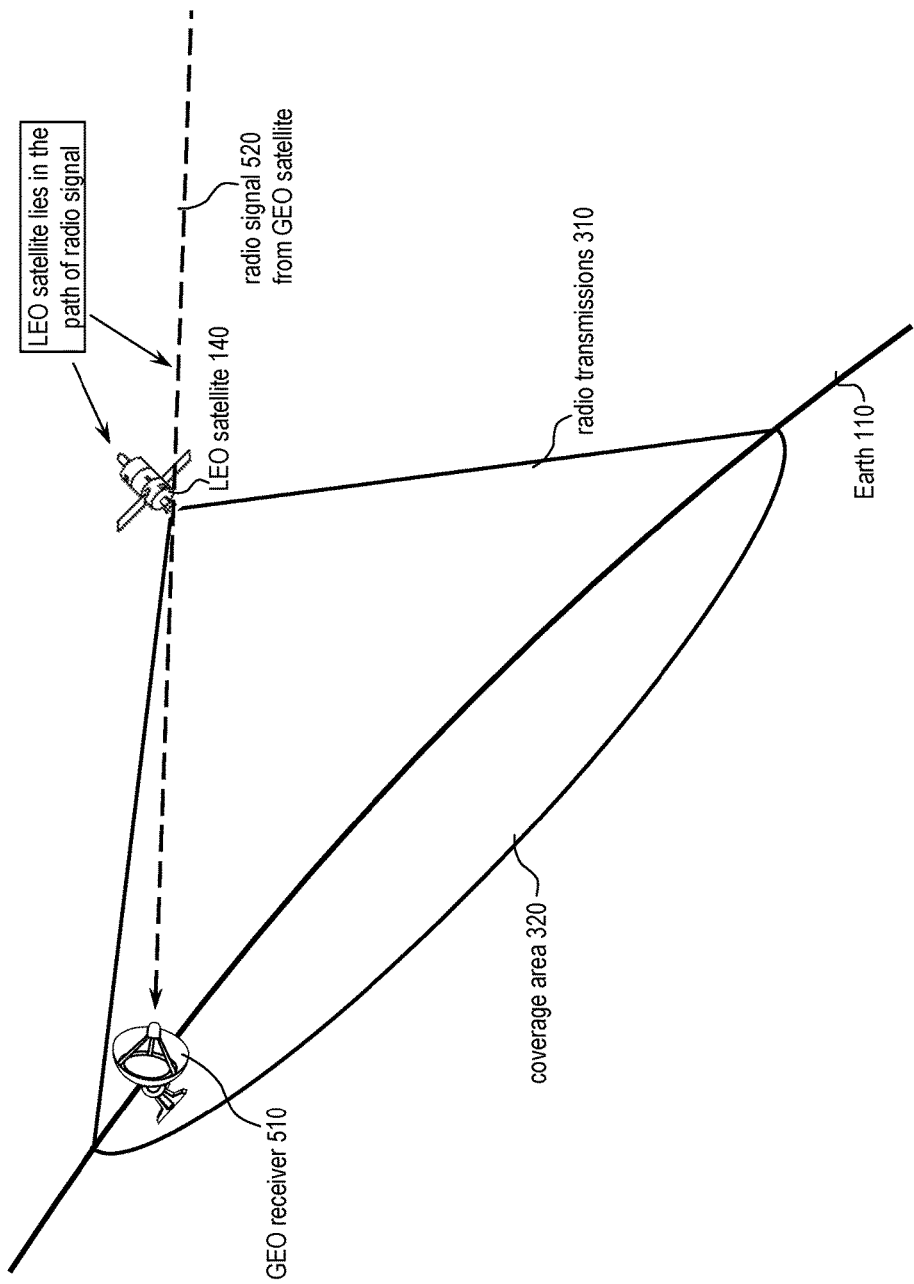
FIG. 5 depicts, in the prior art, a scenario wherein a LEO satellite causes radio interference to a signal from a GEO satellite.
Figure 6:
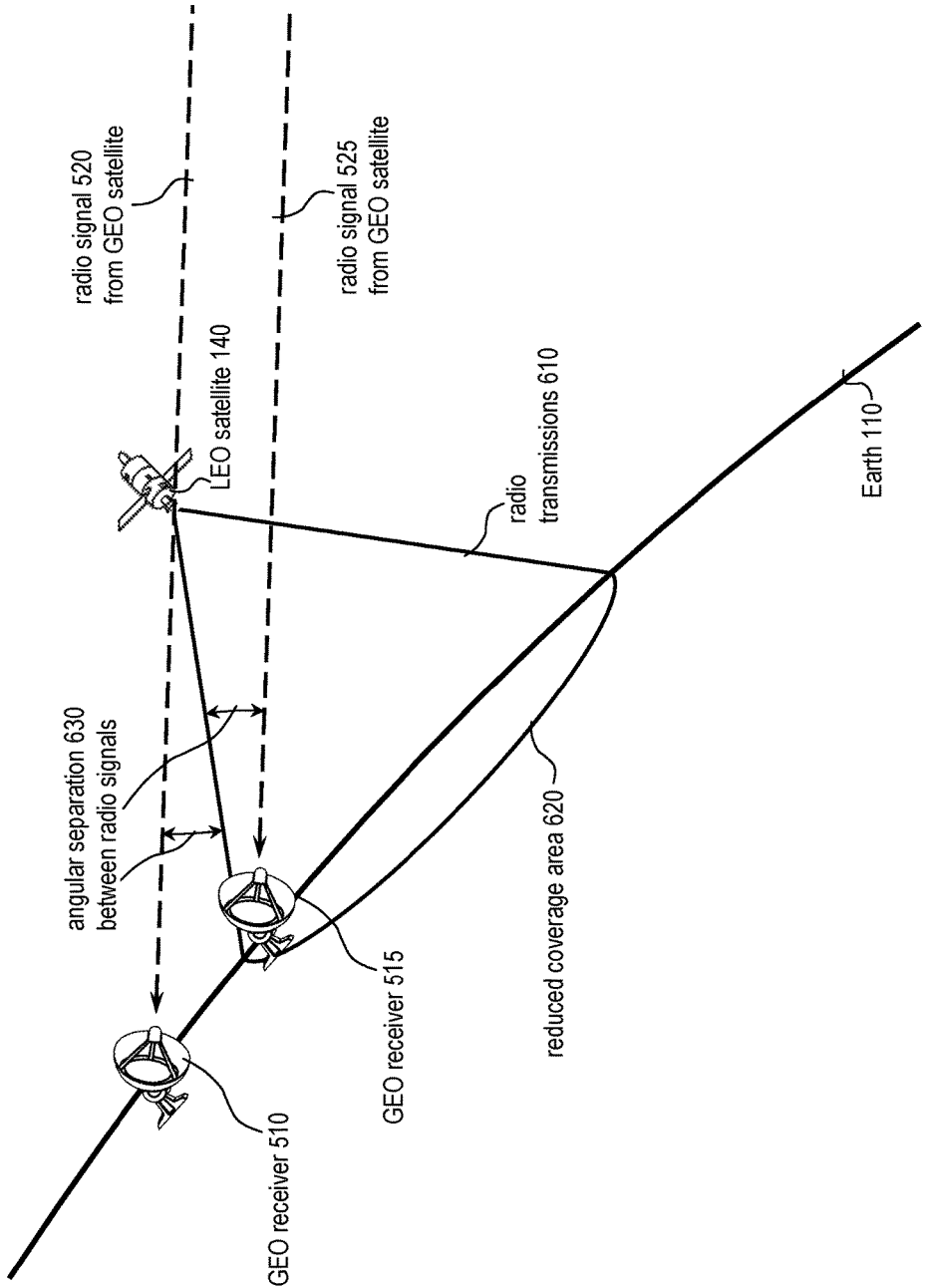
FIG. 6 depicts, in the prior art, an interference mitigation technique.
Figure 7:
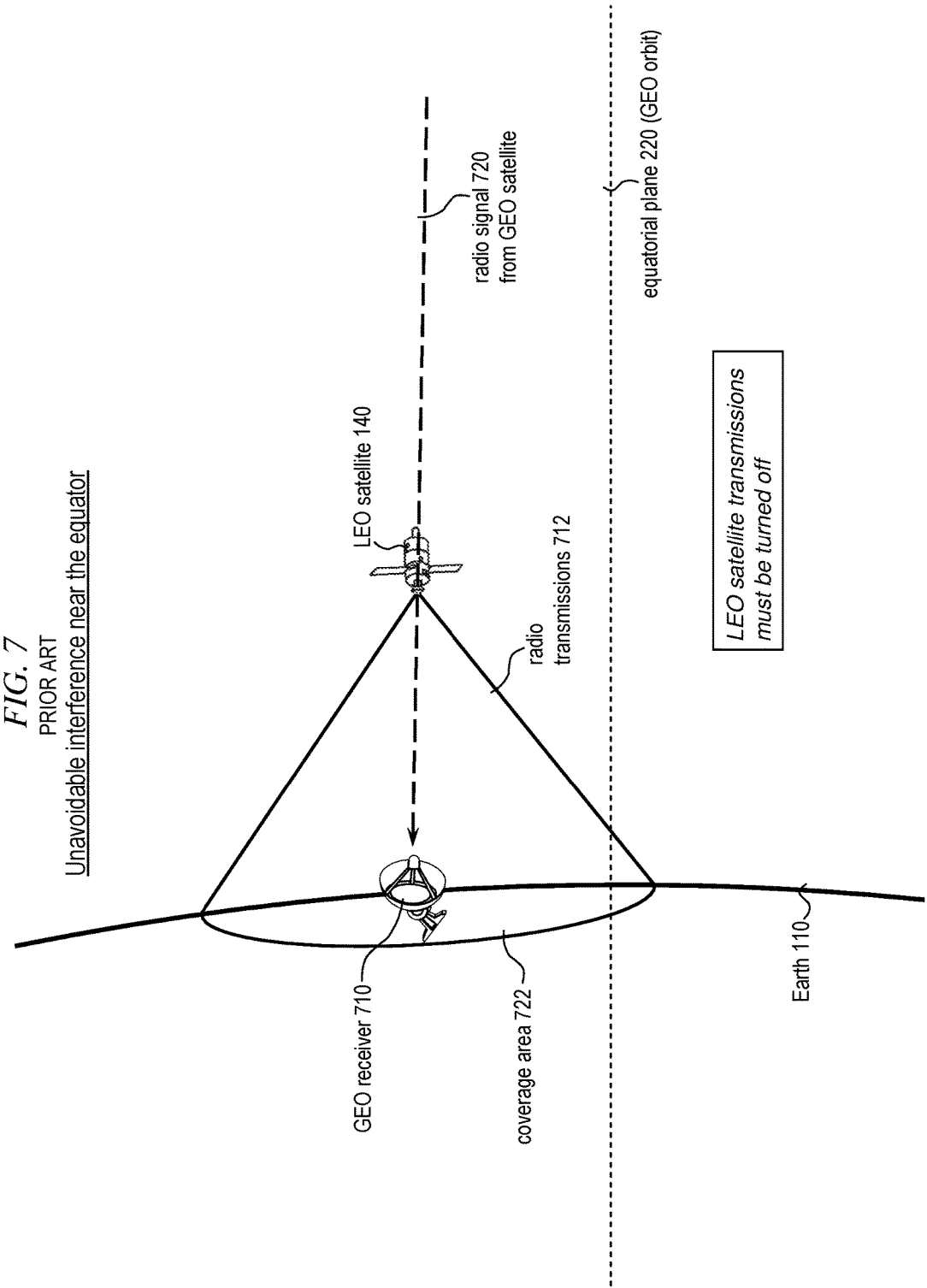
FIG. 7 depicts, in the prior art, a problem with the interference mitigation technique of FIG. 6.
Figure 8:
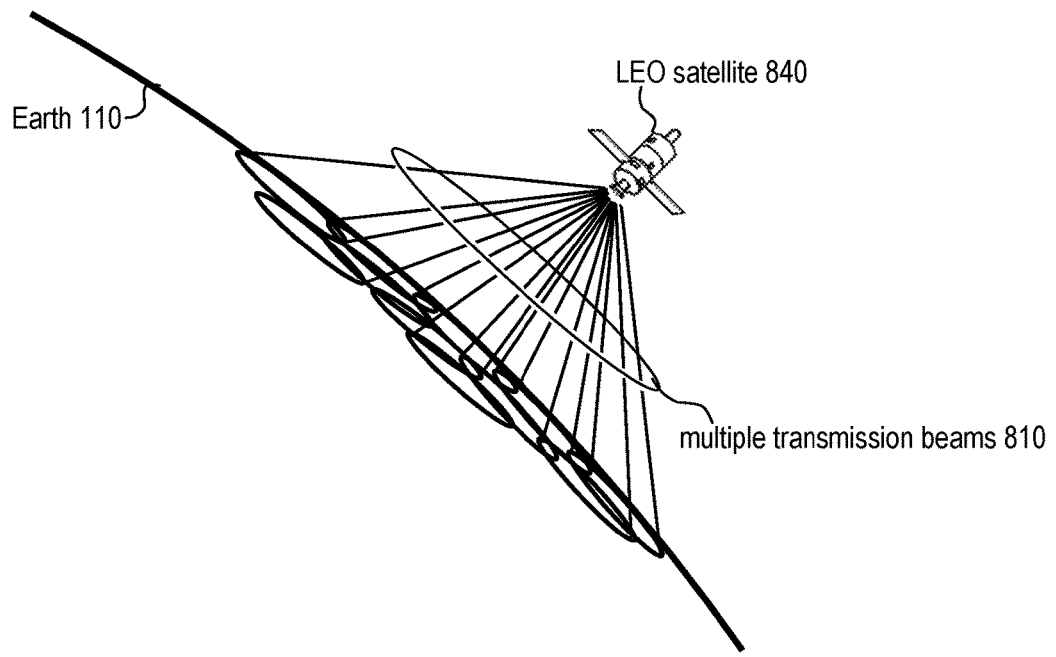
FIG. 8 depicts, in the prior art, a LEO communications satellite capable of transmitting multiple independent beams.
Figure 9:
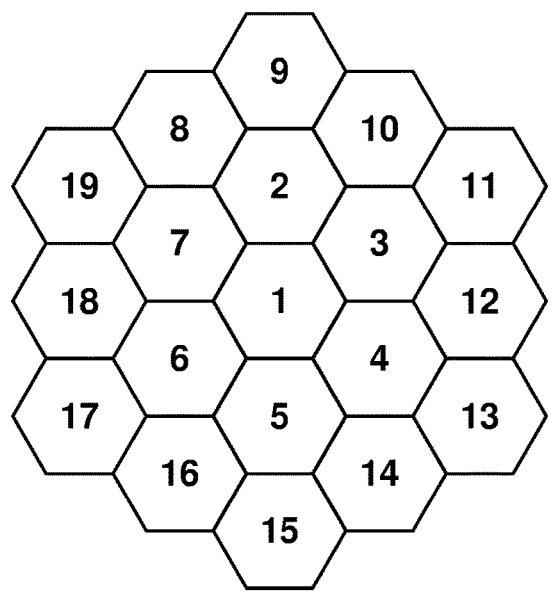
FIG. 9 depicts, in the prior art, an example of a multiple-beam coverage pattern.
Figure 10:
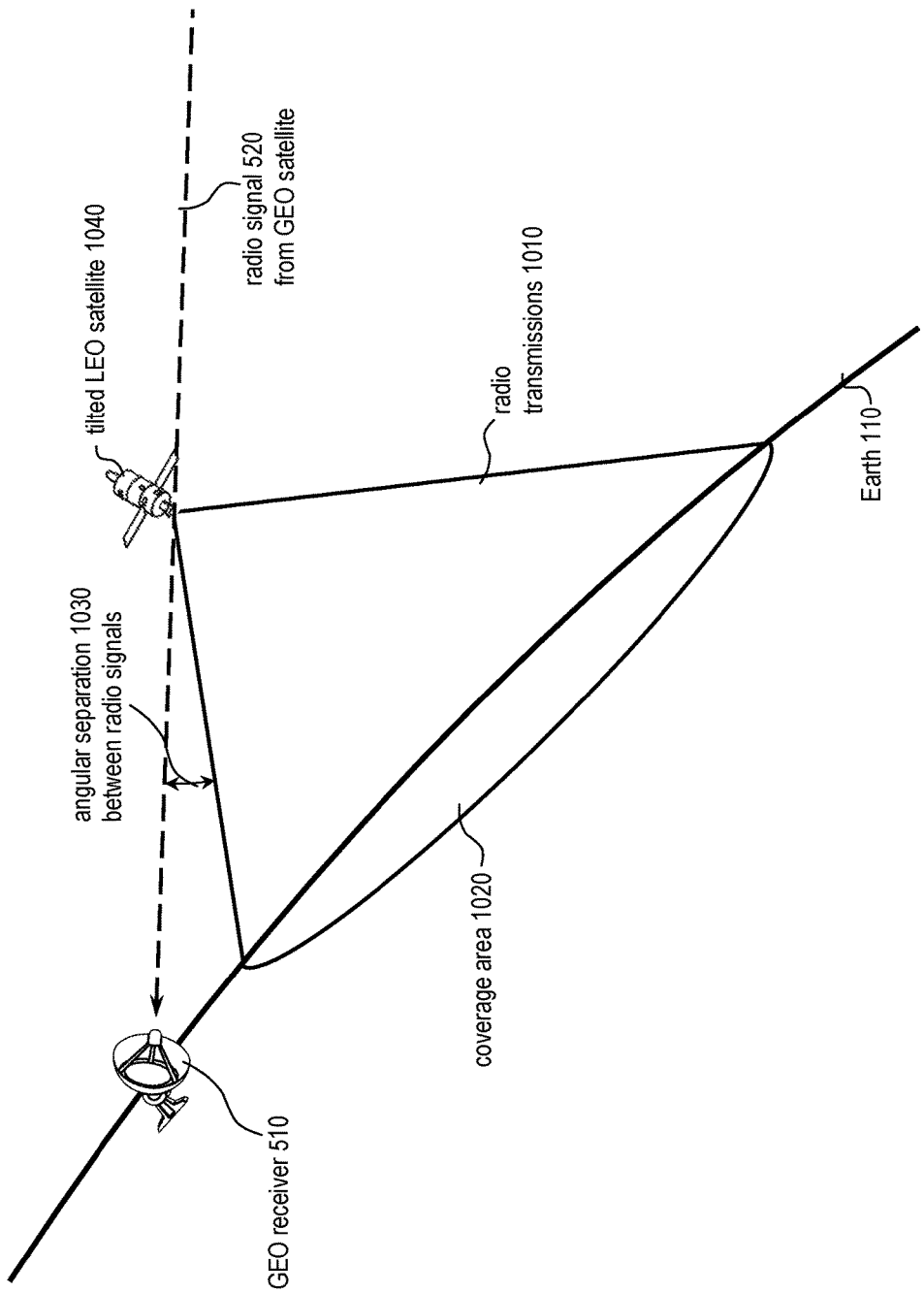
FIG. 10 depicts a method for reducing interference caused by a LEO satellite in accordance with an illustrative embodiment of the present invention.

FIG. 10 depicts a method for reducing interference caused by a LEO satellite in accordance with an embodiment of the present invention. In the figure, GEO receiver 510 is attempting to receive radio signal 520 from a GEO satellite, and a minimum angular separation 1030 is required between the direction of arrival of radio signal 520 and any radio transmissions from LEO satellite 1040. In this figure, LEO satellite 1040, in accordance with the present invention, has the ability to change its orientation (i.e., tilt itself) relative to the surface of the Earth. So, unlike LEO satellite 140 in FIG. 6, this LEO satellite does not reduce the size of its coverage area 1020. Instead, the entire satellite tilts such that its radio transmissions aim away from GEO receiver 510 and the desired angular separation 1030 is maintained.

Since no transmission beams are turned off, the size of the coverage area is not reduced, and the satellite can continue to carry the same volume of traffic. A consequence of the tilt is that coverage area 1020 is no longer centered below LEO satellite 1040. This is in contrast to the prior art, wherein coverage area 620 in FIG. 6 remains centered around the subsatellite point on the surface of the Earth below LEO satellite 140. In FIG. 10, coverage area 1020 is not centered around the subsatellite point; rather, the position of coverage area 1020 is shifted toward the equatorial plane.

Figure 11:
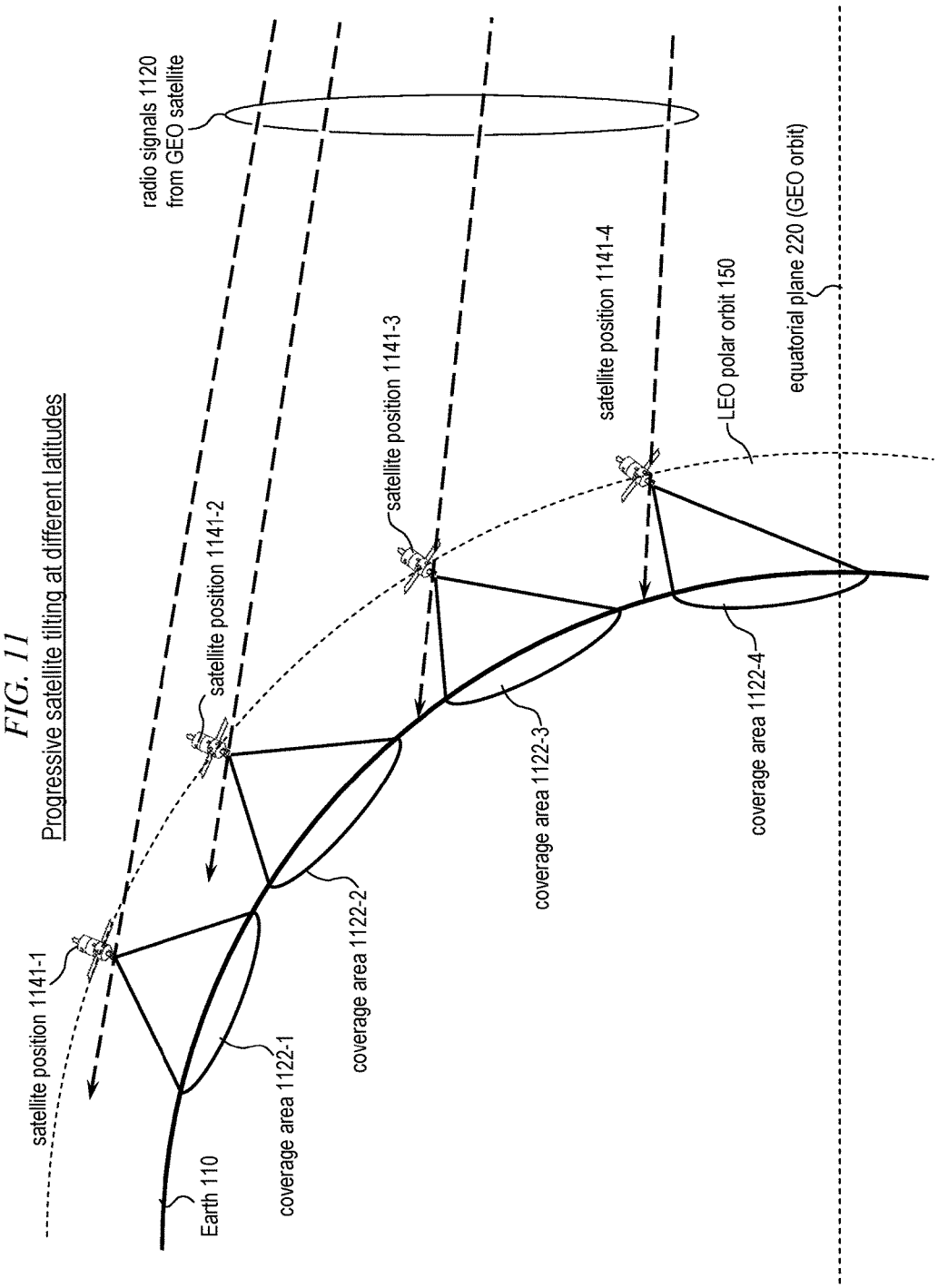
FIG. 11 depicts progressive satellite tilting at different latitudes in accordance with an illustrative embodiment of the present invention.

FIG. 11 shows how the required extent of tilt evolves depending on the position of LEO satellite 1040 along its orbit. The figure depicts four possible positions of the LEO satellite, labeled 1141-1 through 1141-4. For each possible satellite position, the figure depicts the path of the radio signal from a GEO satellite that passes through that position. The four GEO radio signals are collectively labeled as radio signals 1120.

At position 1141-1, the subsatellite point is at a high latitude and the geometry is such that little or no satellite tilting is needed to maintain a large angular separation. The LEO satellite is aiming its transmission beams almost exactly straight down, and its coverage area 1122-1 is almost exactly centered around the subsatellite point. The situation changes progressively for the other positions: the closer the LEO satellite is to the equatorial plane, the larger the tilt needs to be in order to maintain the desired angular separation between radio signals. At position 1141-4, the satellite is very close to the equatorial plane, and, in accordance with the present invention, it needs to be very tilted, compared to a prior-art satellite, in order to maintain the desired angular separation. Correspondingly, coverage area 1122-4 is substantially shifted from the subsatellite point; indeed, FIG. 11 shows that the subsatellite point is outside coverage area 1122-4.

At all positions, the size of the coverage area does not need to be reduced, and the satellite can continue to carry about the same volume of traffic. It is true that, at position 1141-4, the extent of tilt is so great that the footprint of the transmission beams on the surface of the Earth will experience a certain amount of distortion, but the consequences are minor. Compared to the prior art, where the satellite would not be able to transmit at all in position 1141-4, embodiment of the present invention achieve an almost unchanged satellite traffic volume regardless of the position of the coverage area.

FIG. 11 depicts four possible positions for the LEO satellite without specifying a time sequence for the positions. The figure is equally applicable to a satellite that travels in either direction along its orbit. In either case, the position of the coverage area, relative to the subsatellite point, advances in the same direction as the direction of motion of the satellite. In other words, as the satellite moves in its orbit around the earth, the coverage area also moves around the Earth in the same direction as the satellite, but the angular velocity with which the coverage area goes around the Earth is greater than the angular velocity of the satellite! Eventually, the coverage area outruns the satellite. The figure shows that this happens when the satellite reaches the equatorial plane. The next figure shows what happens then.

Figure 12:
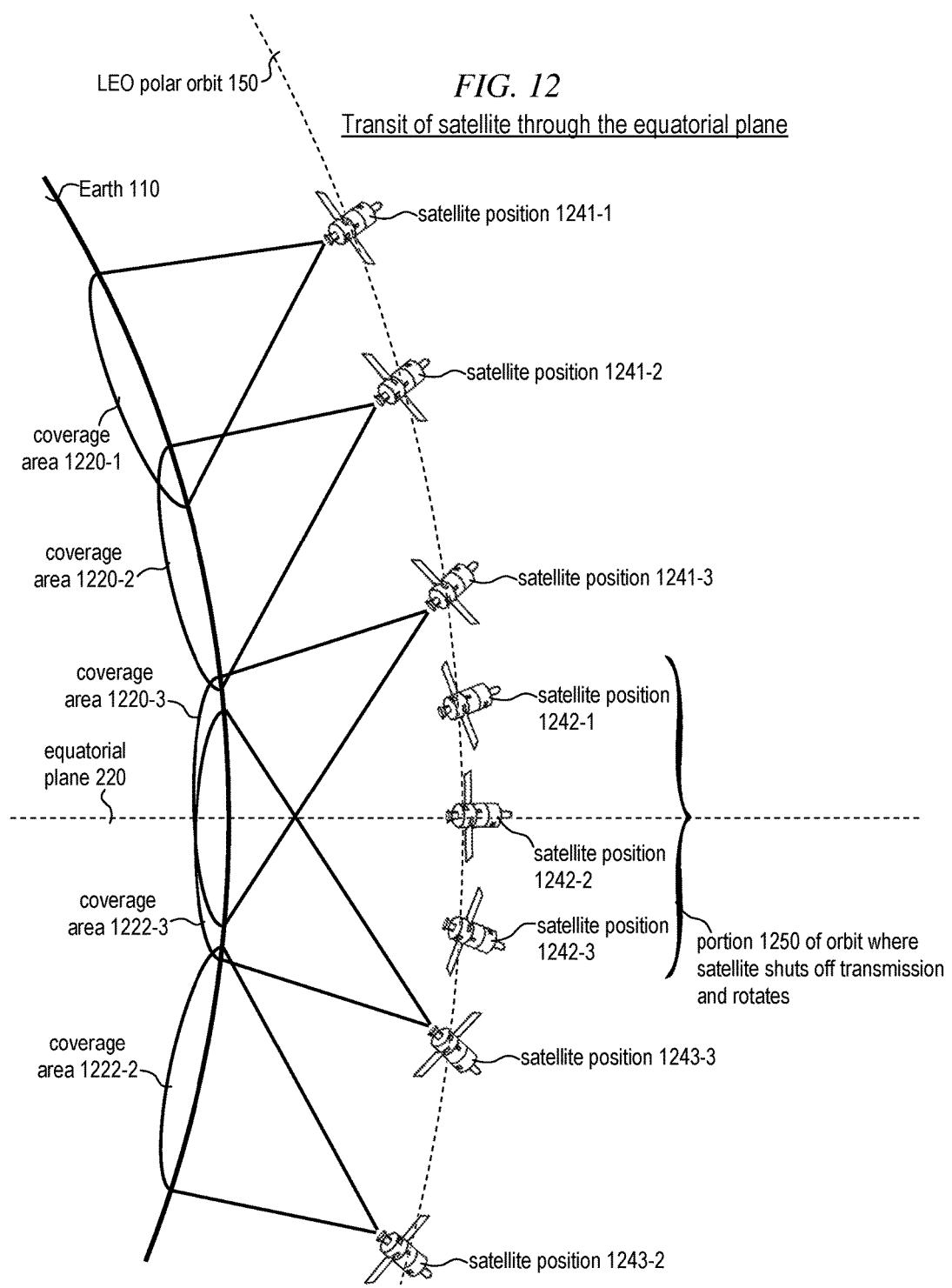
FIG. 12 depicts the transit of a LEO satellite through the equatorial plane and showing the change in position of transmission-beam coverage area as a function of satellite position with respect to the equatorial plane, in accordance with an illustrative embodiment of the present invention.

FIG. 12 shows a magnified view of the passage through the equatorial plane of a LEO satellite in accordance with embodiments of the present invention. A total of eight possible satellite positions are depicted. As before, the figure is equally applicable to a satellite that travels in either direction along its orbit; however, for clarity and ease of explanation, in this discussion it is assumed that the satellite travels downward.

At positions 1241-1 through 1241-3, the LEO satellite is approaching the equatorial plane and, as already discussed, its tilt is progressively increased such that its coverage area advances further and further ahead of the satellite. At position 1214-3, the coverage area 1220-3 is observed to be almost exactly centered on the Equator. Shortly after this position, the satellite turns off all its transmission beams.

With the transmission beams turned off, there is no risk of causing interference to GEO receivers on the surface of the Earth. As the satellite travels through positions 1242-1 through 1242-3, the satellite keeps the transmission beams turned off and starts tilting in the reverse direction. The goal is to have completely reversed the tilt angle by the time the satellite turns on again its transmission beams.

At position 1243-3, the satellite has just turned on its transmission beams. Its orientation, coverage area and beam geometry can be observed to be the mirror image of position 1241-3, relative to the equatorial plane. Now the coverage area 1222-3 is lagging behind the satellite. As the satellite travels away from the equatorial plane to position 1243-2, the tilt is progressively decreased, such that the coverage area, as before, moves on the surface of the Earth in the same direction as the satellite at a greater angular velocity than the satellite. It will progressively catch up to the satellite and, by the time the satellite crosses the equatorial plane again on the other side of the Earth, the coverage area will again be ahead of the satellite, and the process will be repeated.

When the satellite's transmission beams are turned off, no traffic is carried by the satellite. The Earth terminals that are being served by the satellite at that time need to be handed over to a different satellite, if uninterrupted service is to be maintained. Even in a prior-art satellite-communication system, handovers are necessary when the coverage area of one satellite moves from one part of the Earth to another.

Figure 13:
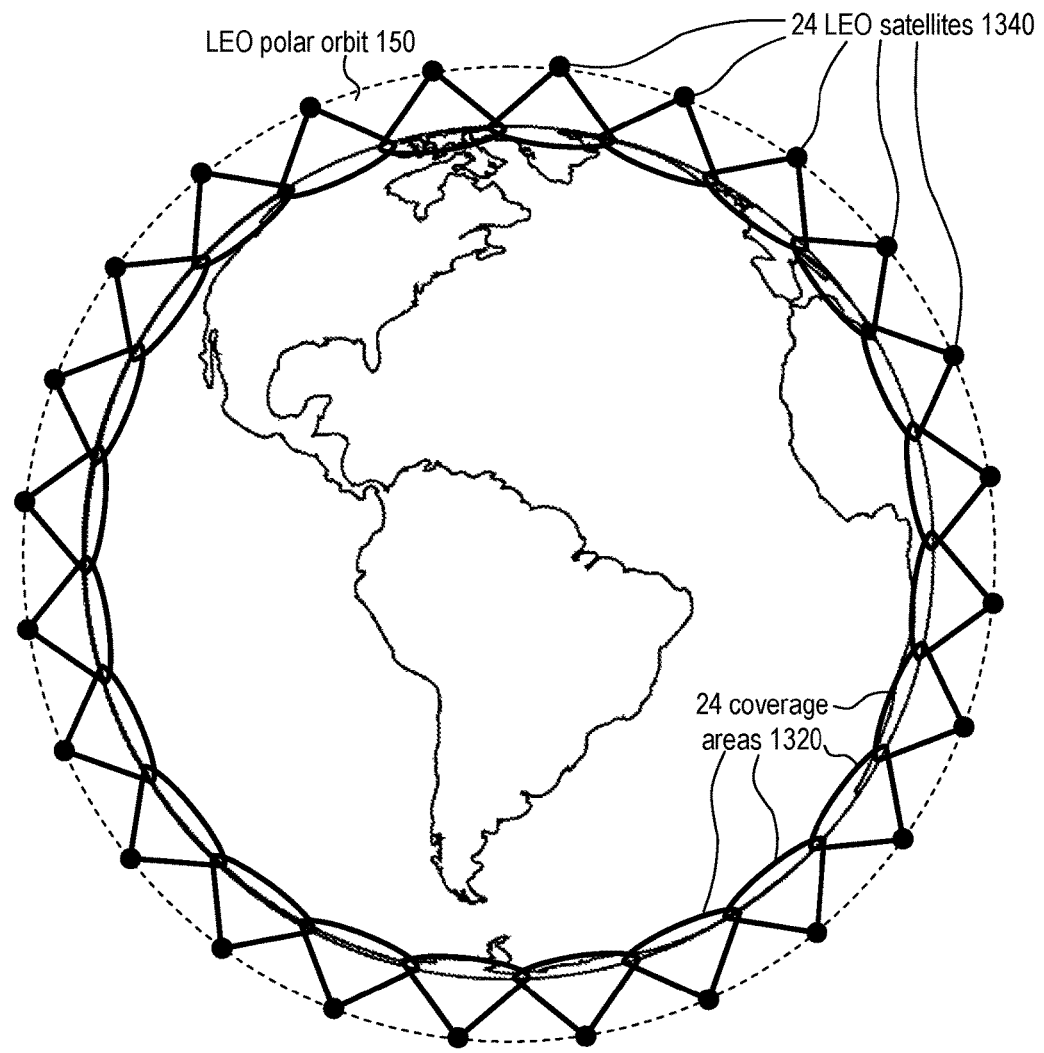
FIG. 13 depicts a system of LEO communications satellites in accordance with the prior art.

FIG. 13 depicts a system of LEO communication satellites in accordance with the prior art. The system comprises multiple LEO orbits, in multiple orbital planes, one of which is shown in the figure as LEO polar orbit 150. The orbit is populated with a plurality of LEO satellites. In the depiction of the figure there are twenty-four LEO satellites 1340 depicted as black dots. Each satellite provides communication services to a coverage area centered around its subsatellite point. Accordingly, in FIG. 13 there are twenty-four coverage areas 1320. In the system of FIG. 13, the satellites do not tilt and, therefore, the pattern of twenty-four coverage areas follows the satellites as they travel around the Earth in their orbit. This system cannot share spectrum with GEO satellites absent some significant mitigation system, which will typically increase cost and/or degrade performance.

Figure 14:
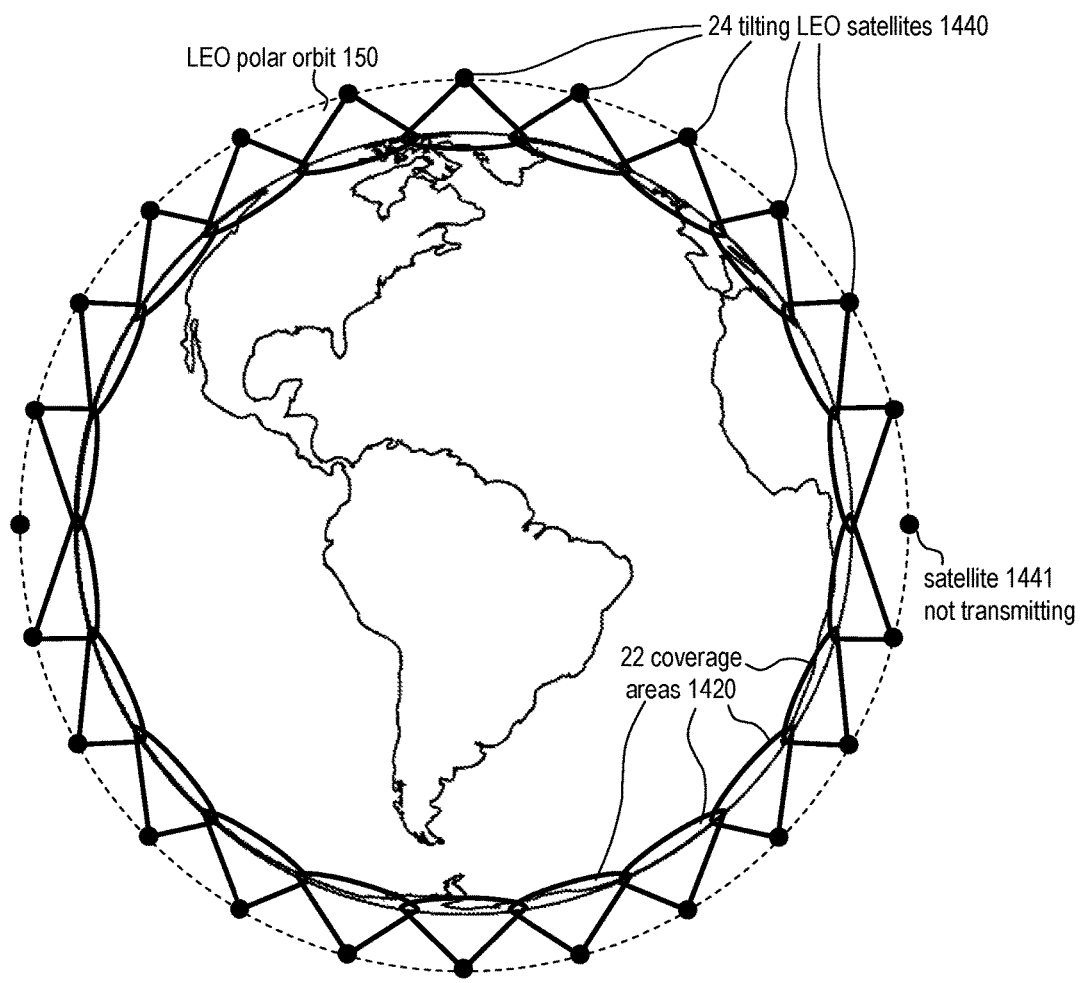
FIG. 14 depicts a system of LEO communications satellites in accordance with an illustrative embodiment of the present invention.

FIG. 14, in contrast, depicts a system of LEO communication satellites in accordance with an illustrative embodiment of the present invention. The system comprises multiple LEO orbits, in multiple orbital planes, one of which is shown in the figure as LEO polar orbit 150. The orbit is populated with a plurality of LEO satellites. In the depiction of the figure there are twenty-four LEO satellites 1440 depicted as black dots, but there are only twenty-two coverage areas 1420. At any given instant, two of the twenty-four satellites are not transmitting; the figure depicts one of the two non-transmitting satellites as satellite 1441.

The reason why the two satellites are not transmitting is because they have turned off their transmission beams while crossing the equatorial plane, as shown in FIG. 12. The part of the earth that lies below the orbit 150 still receives uninterrupted coverage because the twenty-two coverage areas 1420 are contiguous. Traffic is carried by the twenty-two satellites that have not turned off their transmission beams.

As already discussed, a characteristic of this system is that the pattern of twenty-two coverage areas moves around the Earth faster than the orbiting satellites. When a coverage area reaches the Equator and the satellite serving it turns off its transmission beams, it is necessary that another satellite turn on its transmission beams at the same time to provide service to that coverage area, so that system users experience uninterrupted coverage. This process of handing over a coverage area from one satellite to another is illustrated in detail in the next figure.

Figure 15:
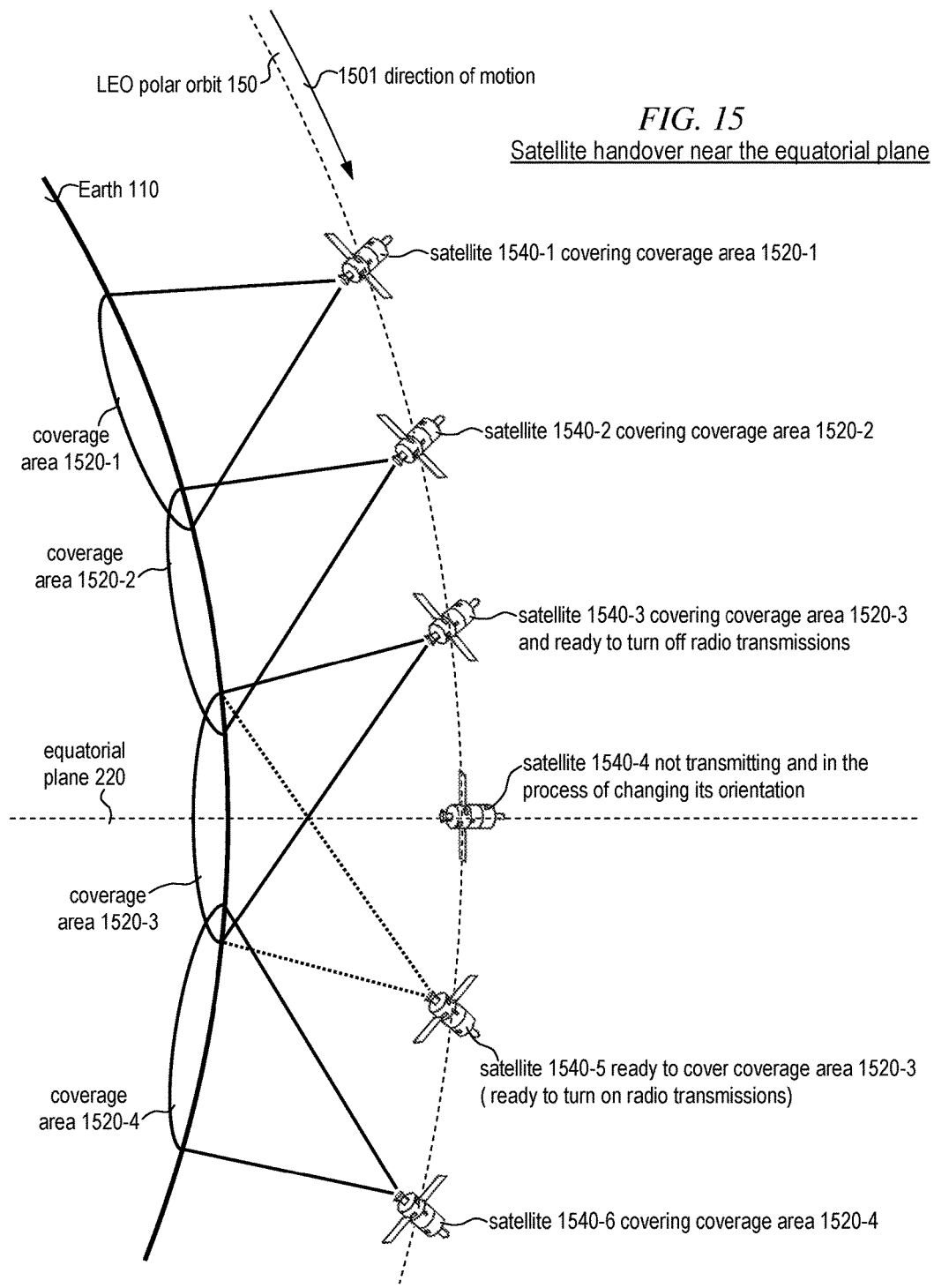
FIG. 15 depicts handover of coverage area, from one LEO satellite to another, near the Equator, in accordance with an illustrative embodiment of the present invention.

FIG. 15 depicts how the handover of a coverage area from one satellite to another occurs near the Equator in accordance with an illustrative embodiment of the present invention. At first glance, this figure appears superficially similar to FIG. 12, but, in this case, the figure depicts a snapshot of multiple satellites in LEO orbit 150 at a particular instant in time. The instant is chosen to be the time when one satellite 1540-4 is transiting through the equatorial plane. Of course, as illustrated in FIG. 12, this satellite 1540-4 has turned off its transmission beams well before this instant in time and is in the process of rotating to reverse the tilt and be ready to turn on its transmission beams again at a later time.

In this particular illustrative embodiment, there are four satellites that are not transmitting at any given time, as they transition across the equatorial plane. That is, on each side of the planet, there is one satellite just approaching the equator, and one ready to be turned back on after having passed the equator. In FIG. 15, in addition to satellite 1540-4, satellite 1540-5 also has its transmission beams turned off at this instant, but it has completed the maneuver of reversing its tilt, and is ready to turn on its transmission beams again. At the same instant, satellite 1540-3 has reached the point where it must turn off its transmission beams. Its coverage area 1520-3 straddles the Equator. As satellite 1540-3 turns off its transmission beams, satellite 1540-5 turns on its transmission beams and starts providing service to coverage area 1520-3, which, therefore, experiences no service interruptions.

In all the embodiments of the present invention presented thus far, satellites have turned on or off all their transmission beams at the same time. However, a satellite can also selectively turn beams on or off at different times. This capability can be advantageously utilized in embodiments of the present invention.

Figure 16:
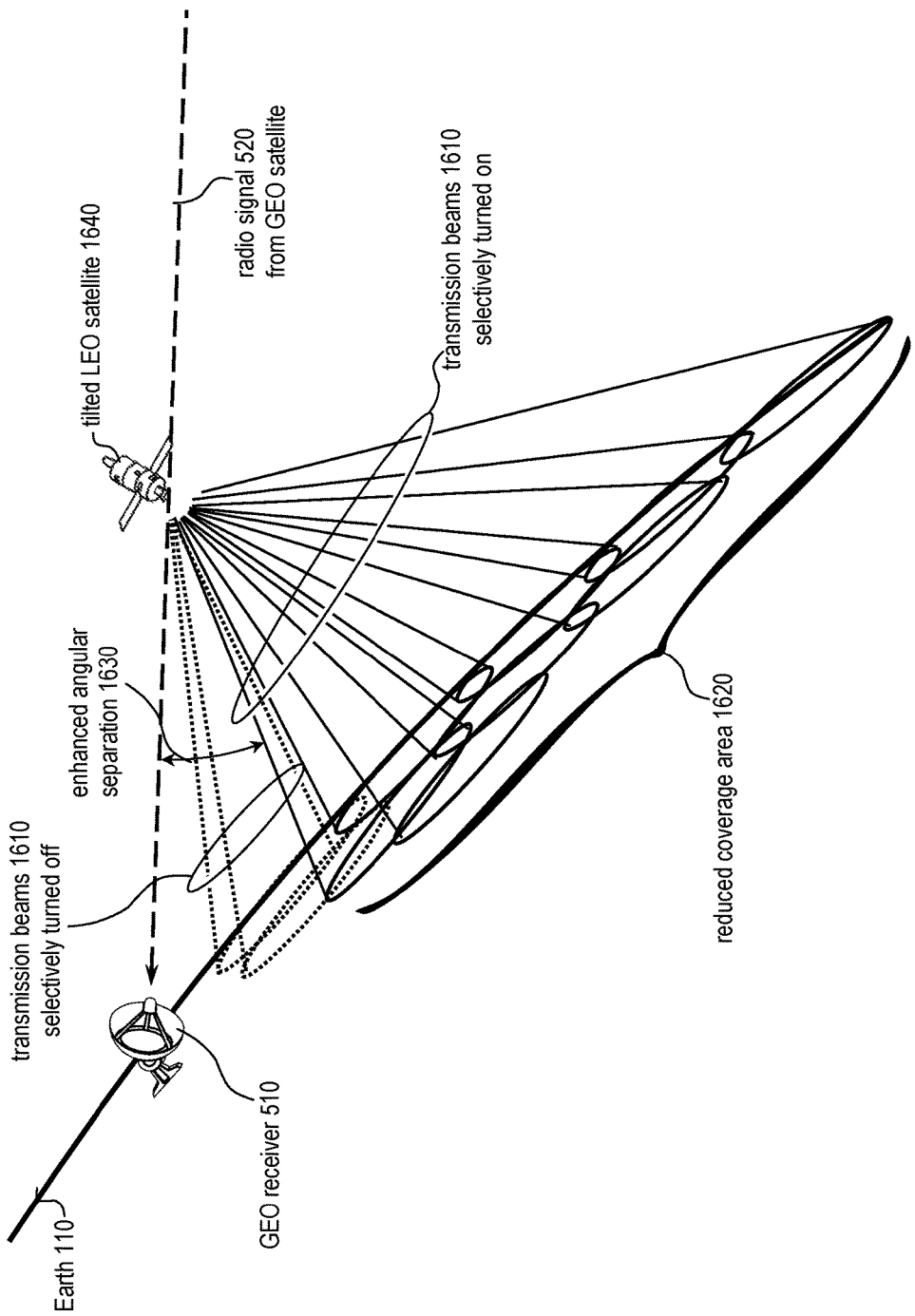
FIG. 16 depicts an alternative embodiment of the present invention wherein interference is mitigated via satellite tilting combined with selective beam activation/deactivation.

FIG. 16 depicts how the ability to selectively turn transmission beams on or off can be utilized in embodiments of the present invention to reduce the amount of satellite tilting that is required. In the figure, LEO satellite 1640 needs to provide adequate angular separation between signals for the benefit of GEO receiver 510 and other GEO receivers on the surface of the Earth. As in FIG. 10, LEO satellite 1640 tilts away from GEO receiver 510 to achieve angular separation, but, in this illustrative example, the satellite also selectively turns off transmission beams 1610 which are aimed near GEO receiver 510. This technique enables LEO satellite 1640 to achieve an enhanced angular separation 1630 without an excessive extent of tilt.

The coverage area will, of course, decrease in size as a consequence of turning off some of the beams. This is shown in FIG. 16 where the coverage area 1620 has a reduced size. However, this is not necessarily a problem, and embodiments of the present invention are possible wherein the size of the coverage area changes depending on the position of the LEO satellite in its orbit. It is also possible to envision embodiments of the present invention wherein, instead of a handover of coverage at the Equator, the size of the coverage area dwindles down to nothing as it approaches the Equator.

Although the present invention has been illustrated in terms of polar orbits for the LEO satellites and equatorial orbits for the GEO satellites, it will be clear to those skilled in the art, after reading this disclosure how to make and use embodiments of the present invention wherein the satellites are in other types of orbits. For example, and without limitation, the present invention can be advantageous for reducing interference to satellites that are in non-geostationary orbits; for example, such satellites might be in an orbit whose plane is inclined relative to the equatorial plane. One notable example of such inclined planes is the so-called GEO stable plane, which is inclined by 7.3° relative to the equatorial plane. Also, satellites in a system in accordance with the present invention might be in non-polar orbits whose plane is inclined, relative to the equatorial plane, or relative to the plane of the satellites for which interference is mitigated, by an angle that is less than 90°.

It is to be understood that this disclosure teaches just one or more examples of one or more illustrative embodiments, and that many variations of the invention can easily be devised by those skilled in the art after reading this disclosure, and that the scope of the present invention is defined by the claims accompanying this disclosure.

DEFINITIONS

Antenna—For the purposes of this specification, an "antenna" is defined as a device for converting an electrical radio-frequency signal into a radio signal, or vice versa, or both. Typically, an antenna is made out of one or more pieces of metal suitably sized shaped and arranged. Antennas might also comprise dielectric materials, in addition to metal. Electrically conductive materials other than metals are sometimes used.

Based on—For the purposes of this specification, the phrase "based on" is defined as "being dependent on" in contrast to "being independent of". Being "based on" includes both functions and relations.

Near-equatorial orbit—At the time of writing this specification, the Wikipedia defines a near-equatorial orbit as "an orbit that lies close to the equatorial plane". The extent of required closeness depends on the surrounding circumstances. For the purposes of this disclosure, a near-equatorial orbit shall be deemed sufficiently close if its inclination angle, relative to the equatorial plane, is sufficiently small to allow embodiments of the present invention to achieve the results set forth in this specification. It will be clear to those skilled in the art when a near-equatorial orbit is close enough to be deemed such.

Equatorial orbit—This is an expression commonly used in the art to refer to a satellite orbit whose orbital plane is the equatorial plane. It is well known in the art that the real orbit of a real satellite cannot remain in the equatorial plane due to perturbations caused by the Sun, the Moon and other causes. A satellite intended to be in an equatorial orbit needs periodic orbital adjustments to correct for such perturbations and bring back its orbit to be near the equatorial plane.

The frequency and extent of such adjustments depends on the satellite's requirements. In particular, depending on the objective of the satellite's mission, there will be a maximum tolerated departure from a perfect equatorial orbit. Adjustments are applied, as needed, to keep the orbital plane within that tolerance. The orbit of such a satellite is still commonly referred to as an equatorial orbit because the nominal orbital plane is the equatorial plane, even though the actual orbital plane, at any given instant, might be at an angle, relative to the equatorial plane, that is within the tolerance.

Orbit—This is a term commonly used in the art to refer to the trajectory followed by an unpowered satellite that is inside the Earth's gravitational well. In particular, an orbit is usually understood to refer to an ellipse with one focus at the center of the Earth. It is understood in the art that such ellipse is only an approximation. In practice, the oblateness of the Earth and the presence of the Sun and the Moon cause perturbations to the orbit such that the actual satellite's trajectory differs from an ellipse. However, the term "orbit" is still commonly used to refer to an ellipse because an ellipse is an excellent approximation for the satellite's trajectory.

Even when such approximation is inadequate, the departure of the actual trajectory from a perfect ellipse is characterized in terms of how the parameters of the ellipse change with time. At any given instant, the satellite is viewed as traveling in an elliptical orbit, which is referred to as the "osculating" orbit.

An ellipse is a plane geometrical curve. Therefore, at any given instant, a satellite is said to move in a well-defined orbital plane; i.e., the plane of the osculating orbit. As the parameters of the osculating orbit change with time, the plane of the orbit will also, in general, change.

When a satellite fires its thrusters, the osculating orbit changes suddenly in response to the changed velocity of the satellite.

To Exhibit—For the purposes of this specification, the infinitive "to exhibit" and its inflected forms (e.g., "exhibiting", "exhibits", etc.) is defined as "to manifest or make evident."

To Generate—For the purposes of this specification, the infinitive "to generate" and its inflected forms (e.g., "generating", "generation", etc.) should be given the ordinary and customary meaning that the terms would have to a person of ordinary skill in the art at the time of the invention.

Radio signal—For the purposes of this specification, a "radio signal" is defined as a signal consisting of an electromagnetic wave that propagates through air or vacuum without needing a material support such as a wire, a connector, or a transmission line.

When—For the purposes of this specification, the word "when" is defined as "upon the occasion of."

What is claimed is:

1. A method for sharing radio spectrum between a first communication satellite in a near-equatorial orbit around the Earth, and a second communication satellite in a lower orbit, wherein the lower orbit intersects the plane of the near-equatorial orbit at an ascending node and at a descending node, the method comprising:
   (i) transmitting, by the second satellite, one or more radio signals in a geometric pattern of one or more transmission beams aimed at the surface of the Earth;

(ii) progressively tilting the directions of the transmission beams as the second satellite moves along the lower orbit;
wherein the extent of tilting is based on:
(a) the position of the second satellite in the lower orbit; and
(b) a first direction of arrival of a first radio signal from the first satellite, as observed at a location on the surface of the earth; and
(c) a second direction of arrival of a second radio signal from the second satellite, as observed at said location on the surface of the earth, said location lying within a coverage area covered by the second satellite; and further wherein:
the extent of tilting is such that the angular separation between the first direction of arrival and the second direction of arrival meets or exceeds a predetermined minimum requirement, and
the tilting causes the coverage area to move on the surface of the Earth faster than the subsatellite point.

2. The method of claim 1 wherein the tilting is accomplished by tilting the entire second satellite.

3. The method of claim 1 wherein the tilting is accomplished by tilting a portion of the second satellite that comprises one or more radio antennas, wherein the one or more radio antennas are for transmitting one or more of the transmission beams.

4. The method of claim 3 wherein the positions of the one or more radio antennas, relative to one another, do not change when the extent of tilting is changed.

5. The method of claim 1 wherein the tilting is accomplished electronically.

6. The method of claim 1 further comprising:
(iii) turning off one transmission beam based on a third direction of arrival of a third radio signal that is part of the one transmission beam,
wherein the third direction of arrival is as observed at said location on the surface of the Earth; and
wherein the time when the transmission beam is turned off is based on the angular separation between the third direction of arrival and the first direction of arrival.

7. The method of claim 6 wherein all transmission beams have been turned off by the time when the second satellite reaches the ascending node or the descending node.

8. The method of claim 6 further comprising:
reducing the extent of tilting, compared to the extent of tilting that would be required for meeting the minimum requirement if the transmission beam had not been turned off.

9. A system of communication satellites comprising:
A plurality of first communication satellites orbiting the Earth in a first orbit that is the same for all first satellites;
wherein the first orbit intersects the plane of a second orbit of a second communication satellite at an ascending node and at a descending node;
wherein the second orbit is a near equatorial orbit and is higher than the first orbit;
wherein each first satellite comprises one or more radio antennas for transmitting one or more radio signals in a geometric pattern of one or more transmission beams aimed at the surface of the Earth;
wherein each first satellite comprises tilting apparatus for progressively tilting the directions of the transmission beams as the each first satellite moves along the first orbit;
wherein each first satellite operates the tilting apparatus to generate a tilt such that a coverage area on the surface of the Earth served by the each first satellite advances along the first orbit faster than the satellite;
wherein the number of coverage areas served by the system is less than the number of communication satellites, due to each first satellite turning off all of its transmission beams by the time same reaches the ascending node or the descending node, with no loss in coverage area as a consequence thereof; and
wherein the pattern of coverage areas moves across the surface of the Earth at an angular velocity greater than the angular velocity of the satellites.

10. The system of claim 9 wherein the tilting apparatus tilts the entire each first satellite.

11. The system of claim 9 wherein each first satellite turns off at least one or more of its transmission beams when it is near the ascending node or the descending node.

12. The system of claim 9 wherein each first satellite reverses its tilt while all its transmission beams are turned off, such that, when one or more of its transmission beams are turned back on, the coverage area served by the each first satellite trails behind the satellite as the satellite travels in the first orbit.

13. The system of claim 9 wherein the tilting apparatus comprises reaction wheels.

14. The system of claim 9 wherein the tilting apparatus tilts a portion of each first satellite, wherein the portion comprises the one or more radio antennas.

* * * * *